(12) United States Patent
Lo

(10) Patent No.: US 8,531,573 B2
(45) Date of Patent: Sep. 10, 2013

(54) DIGITAL CAMERA AND OPERATING METHOD THEREOF

(75) Inventor: Hsin-Ran Lo, Taipei County (TW)

(73) Assignees: Inventec Appliances (Shanghai) Co. Ltd., Shanghai (CN); Inventec Appliances Corp., Taipei (TW)

( * ) Notice: Subject to any disclaimer, the term of this patent is extended or adjusted under 35 U.S.C. 154(b) by 325 days.

(21) Appl. No.: 13/005,413

(22) Filed: Jan. 12, 2011

(65) Prior Publication Data

US 2011/0176039 A1 Jul. 21, 2011

(30) Foreign Application Priority Data

Jan. 15, 2010 (CN) .......................... 2010 1 0022835

(51) Int. Cl.
*H04N 5/222* (2006.01)
*H04N 5/235* (2006.01)

(52) U.S. Cl.
USPC ...................................... 348/333.01; 348/362

(58) Field of Classification Search
USPC .................. 348/229.1, 294, 333.01, 353, 362
See application file for complete search history.

(56) References Cited

U.S. PATENT DOCUMENTS

| | | | | |
|---|---|---|---|---|
| 8,259,208 B2* | 9/2012 | Ciurea et al. | ............. | 348/333.02 |
| 2006/0291844 A1* | 12/2006 | Kakkori | .......................... | 396/89 |
| 2008/0239133 A1* | 10/2008 | Cazier et al. | ............. | 348/333.05 |
| 2009/0244329 A1* | 10/2009 | Kuniba | .......................... | 348/241 |
| 2009/0256814 A1* | 10/2009 | Chung et al. | .................. | 345/173 |

\* cited by examiner

*Primary Examiner* — Trung Diep
(74) *Attorney, Agent, or Firm* — WPAT, P.C.; Anthony King

(57) ABSTRACT

A digital camera and an operating method thereof are disclosed. The digital camera includes an image sensing module, a display, an operating element, and a control module. The image sensing module consists of N pieces of image sensing elements. The display is used to show a first image. The operating element is used by a user to select a specific area in the first image and set correction parameters for the specific area. The control module is connected to the image sensing module and the display for obtaining information about a position of the specific area relative to the first image and the correction parameters, and uses the obtained position information and the correction parameters to control M pieces of the image sensing elements in the image sensing module corresponding to the specific area, so that a second image is obtained based on the correction parameters.

10 Claims, 4 Drawing Sheets

DIGITAL CAMERA AND OPERATING METHOD THEREOF

FIELD OF THE INVENTION

The present invention relates to a digital camera and an operating method thereof, and more particularly to a digital camera and an operating method thereof that can overcome a high contrast between different areas in an image to be taken.

BACKGROUND OF THE INVENTION

Thanks to the advanced technology and relatively matured semiconductor techniques, digital cameras using complementary metal-oxide-semiconductor (CMOS) or charge-coupled device (CCD) as the image sensing elements thereof can now present high-quality images. Even the consumptive-grade cameras can satisfy the general consumers' demands for image color and high definition. Currently, the advanced digital single-lens reflex (DSLR) cameras have also been widely accepted among critical professional photographers to almost replace the role of the conventional cameras using film. Now, with the further reduced selling price thereof, the small-size digital cameras have become highly popular among general users, and there is incredible growth in the number of users of the professional-grade DSLR cameras, too. Taking photos is no longer an expensive leisure activity. Everyone can obtain rich information about cameras and photography over the Internet and learn to be a good photographer. Meanwhile, various kinds of special applications and requirements are developed in response to the prosperous growth of digital camera market.

However, as being limited by some bottlenecks in the currently available technology, the image sensing elements of the digital camera have relatively narrow latitude of environmental brightness. The image sensing elements using CMOS or CCD have latitude of brightness about 5 EV, which is apparently much lower than the 10 EV obtainable from the conventional film. When taking a picture in an environment with relatively high contrast in brightness, such as taking a sunset picture, and measuring the amount of light in the low-brightness area, the obtained picture would show overexposure around the setting sun. In the overexposure condition, the image has color scale that could not show color gradations to thereby lose details of the image. This condition is of course not acceptable by users who require for high image quality.

Currently, there are many ways to overcome the above-mentioned problem. For example, a user can use different exposure values to take several pictures of the same scene for showing different brightness levels, and then use advanced image processing software to do spectrum analysis and other adjustment and processing to synthesize several pictures, so as to show the details that are lost in the overexposed image. However, such image processing requires relatively complicated procedures and only persons who have rich experiences and sufficient technical background in the photographical field can well manipulate these techniques to obtain a perfect photograph.

SUMMARY OF THE INVENTION

A primary object of the present invention is to provide a digital camera that enables a user to easily operate it to overcome a high contrast between different areas in an image to be taken.

To achieve the above and other objects, a digital camera according to an embodiment of the present invention includes an image sensing module, a display, an operating element, and a control module. The image sensing module consists of N pieces of image sensing elements for obtaining a plurality of image signals corresponding to a first image, wherein N is a positive integer larger than 1. The display is used to show the first image taken with the digital camera. The operating element is used by a user to select a specific area in the first image and to set correction parameters for the specific area. The control module is connected to the image sensing module and the display for obtaining information about a position of the specific area relative to the first image and the correction parameters, and uses the obtained position information and the correction parameters to control M pieces of the image sensing elements in the image sensing module corresponding to the specific area, so that a second image is obtained based on the correction parameters, wherein M is a positive integer smaller than or equal to N.

The image sensing module consists of a plurality of image sensing elements, and the image sensing elements can be respectively a CCD or a CMOS for receiving external light and converting the received light into an image. The image sensing elements can be independently set to receive or stop receiving light and to begin or end the exposure, accordingly.

The display is a flat panel display for showing images taken with the digital camera or playing back images stored in the digital camera. In addition, the display can be otherwise a touch screen providing the camera with an interface for touch input.

The operating element is used by a user to specify an area to be edited in the image stored in the camera. Pictures stored in the camera are referred to as the first images; and the area selected by the user is referred to as the specific area. Meanwhile, the user can use the operating element to set a plurality of correction parameters for the specific area. The correction parameters can be exposure time and values for different parts of the camera, such as the shutter release button, the aperture and the like. The operating element can be a user's finger, a stylus, or a button.

The control module is connected to the image sensing module and the display for obtaining information about a position of the specific area relative to the first image and the correction parameter, and uses the obtained position information and the correction parameter to control the image sensing elements in the image sensing module corresponding to the specific area, so that a processed image can be obtained based on the correction parameters. The processed image is referred to as a second image. The number of the image sensing elements corresponding to the specific area is smaller than the number of the image sensing elements in the image sensing module. Further, the control module is a general name representing all the software, firmware and hardware in the camera instead of being an individual control element or body.

The image sensing elements corresponding to the specific area have an exposure-start time that can be the same as or different from the exposure-start time of the image sensing elements corresponding to a non-specific area.

In addition to the image sensing module, the display, the operating element and the control module, the digital camera further includes an image calculation module connected to the image sensing module and the display for converting a plurality of image signals generated by the image sensing elements into the first image for showing on the display.

Another object of the present invention is to provide an operating method of a digital camera, so that a user can easily and conveniently operate the digital camera to improve the problem of a high contrast between different areas in an obtained image as found in the prior art.

To achieve the above and other objects, the operating method of a digital camera according to an embodiment of the present invention includes the following steps: obtaining an image or reading out an image stored in an internal memory of the camera, and using the image as a first image; displaying the first image on a display; determining a specific area on the first image as selected by a user, and a correction parameter as set by the user for the specific area; obtaining information about a position of the specific area relative to the first image; and using the correction parameter and the position information to control image sensing elements in an image sensing module of the camera corresponding to the specific area, so that a second image is obtained based on the correction parameter.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
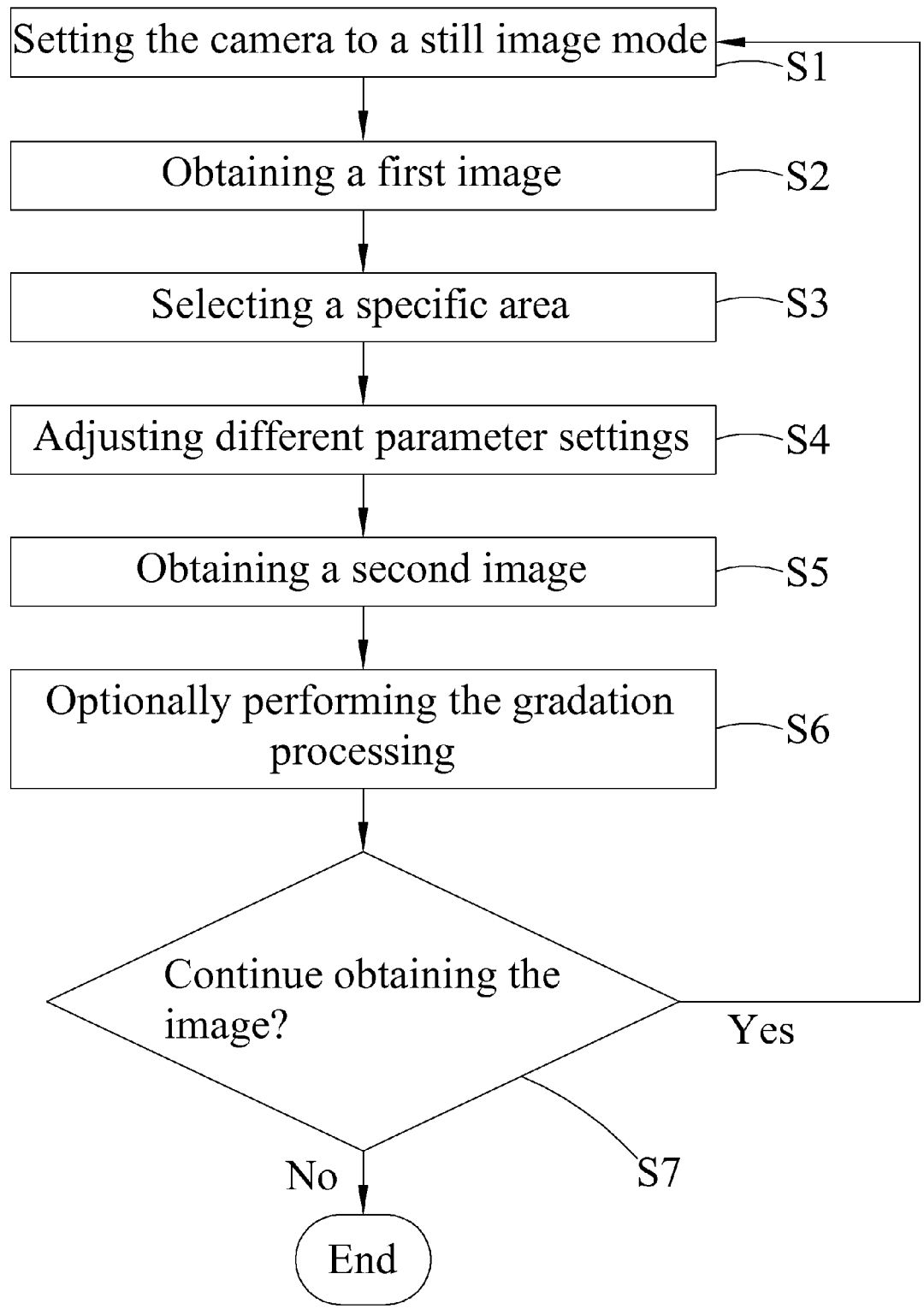
FIG. 1 is a flowchart showing the steps of an operating method of a digital camera according to an embodiment of the present invention for correcting an overexposure condition.

Please refer to FIG. 1 which is a flowchart showing the steps in an operating method of a digital camera according to the present invention for correcting an overexposure condition. First, a picture is taken by the digital camera, and the digital camera is set to a still image mode (step S1). A control module of the digital camera controls an image sensing module to begin an exposure process according to preset parameters in order to obtain a first image. Alternatively, an image stored in the digital camera can be accessed to serve as a first image. Then, the first image is shown on a display of the digital camera for a user to view and check (step S2). At this point, the user can check the result of the first image via the display, such as overexposed or underexposed. Thus, the user may use an operating element to select a specific area on the first image shown on the display (step S3). Furthermore, the user may check the parameters previously set for the specific area as shown on the display. The parameters may include exposure compensation value (EV), exposure time, aperture value and other necessary parameters that are to be adjusted for taking another picture. The user can change these parameters if he or she does not think the preset values are suitable (step S4). The operating element can be a conventional button. Or, the operating element can be a stylus or the user's finger upon the display being a touch screen.

After the parameters have been set to the desired values, the user can press a shutter release button of the digital camera (step S5) to obtain a second image. The control module will follow the parameter values as set by the user to control the image sensing module and other software, firmware and hardware of the digital camera to perform exposure-related procedures and begin the exposure. After the exposure is finished, a calculation module of the digital camera will correct, compose, or modify the obtained second image, and then, the second image is displayed on the display. At this point, the user may decide whether it is necessary to proceed with a gradation process for the image (step S6). If yes, the user may use the operating element to input an instruction to the camera, so that the image calculation module performs the gradation process to soften the edge of the image for making the image look more natural. Or, if the user decides not to soften the image bound, he or she can ignore this function option and uses the operating element to touch an OK button on the camera or gently presses the shutter release button to end this process and returns to the still image mode (step S7).

Figure 2:
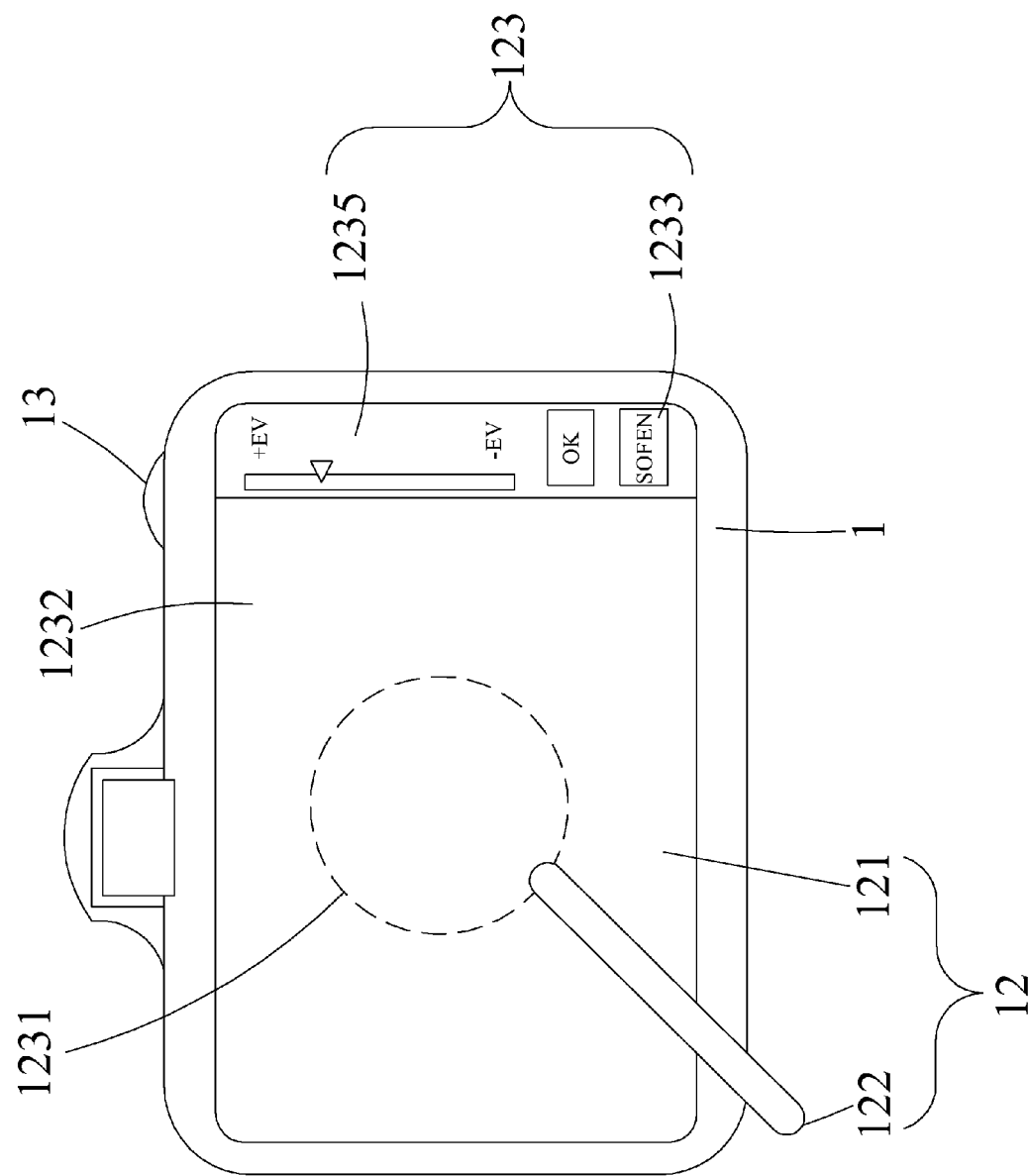
FIG. 2 is a schematic view of a digital camera according to an embodiment of the present invention.

Please refer to FIG. 2 that schematically shows a digital camera 1 according to an embodiment of the present invention. As shown, the digital camera 1 includes an image sensing module (not shown) consisting of N pieces of image sensing elements, wherein N is a positive integer larger than 1. The image sensing elements can be respectively a CCD or a CMOS for receiving external light and converting the received light into an image. The image sensing elements can be independently set to stop receiving light at any time, so as to determine the termination or beginning of the exposure thereof. Taking advantage of this feature of the image sensing elements, the present invention enables or disables individual image sensing elements to achieve the purpose of adjusting the exposure level of different image sensing areas.

The display 121, such as a flat panel display, can show the images taken with the digital camera or play back images stored in the digital camera. In practical application, the display 121 can be a liquid crystal display (LCD) or an organic diode display having a flat panel. In addition, the display 121 can be otherwise a touch screen providing the camera with an interface for touch input. The touch screen can be a capacitive touch screen, a resistive touch screen, or a surface wave touch screen. The operating element 122 varies with different touch screen structures. For example, the operating element 122 corresponding to the capacitive touch screen must be a conductive object, such as the user's finger. Styluses made of plastic material are unusable with the capacitive touch screen. There is not any particular restriction to the operating element for the surface wave touch screen and the resistive touch screen. Both the user's finger and general styluses can serve as the operating element 122 for use with the surface wave touch screen and the resistive touch screen. When the display 121 is a touch screen, a function bar 123 can be provided on the touch screen, via which the user can select various functions. The function bar 123 also includes a parameter setting bar 1235.

The operating element 122 serves as an element for the user to input information to the camera and specify an area to be edited. Pictures stored in the camera before current shooting or images temporarily stored in the camera immediately after shooting are referred to as the first images; and the area selected by the user is referred to as the specific area 1231. Wherein, the number of the image sensing elements corresponding to the specific area 1231 is M, which is a positive integer smaller than or equal to N. Meanwhile, the user can use the operating element 122 to set a plurality of correction parameters for the specific area 1231. The correction parameters can be exposure time and values for different parts of the camera, such as the shutter release button, the aperture and the like, without being limited thereto. The operating element 122 can be a user's finger, a stylus, or a button without being limited thereto.

The specific area can be selected by drawing a circle or blocking an area in the displayed image using the operating element 122. In the case of drawing a circle to select the specific area, the user needs only to draw an outline of the area, and the image calculation module will analyze, for example, the image's grayscale value to automatically recognize the most suitable bound. When the drawing of outline is finished, a beginning and an end of the drawn line will connect to each other to define a selected area, that is, the specific area 1231. Area other than the specific area 1231 is referred to as a non-specific area 1232. At this point, the user can use the operating element 122 to change the settings for the specific area 1231. The function bar 123 further includes a soften button 1233, via which the user can select whether to proceed with the gradation process to soften the bound of the image, so that the image looks more natural.

In the case of selecting the specific area by blocking an area, the user needs only to block a rough area, and software in the image calculation module will analyze, for example, the image's grayscale value to automatically recognize the most suitable bound and create a selected area, that is, the specific area 1231. Area other than the specific area 1231 is referred to as a non-specific area 1232. At this point, the user can use the operating element 122 to change the settings for the specific area 1231.

The control module (not shown) controls the exposure condition and the exposure time of the image sensing module and the image sensing elements, and the operation of the aperture, the shutter release button 13 and other different parts and modules. The parameters input by the user with the operating element 122 form the instructions to the control module.

The user can control the display 121 to show an earlier image which is taken for a basic image, and then use the operating element 122, which can be a button, a stylus or the user's finger, to select one or more specific areas 1231 via the display 121. Thereafter, the user can set different parameters, such as exposure time and exposure compensation value (EV), for each of the specific areas. The control module sets the exposure time for each of the image sensing elements of the image sensing module, and sets a sequence of exposure for the specific areas 1231 or the non-specific area 1232, so that different areas respectively have a controlled exposure time in successive exposures.

Figure 3:
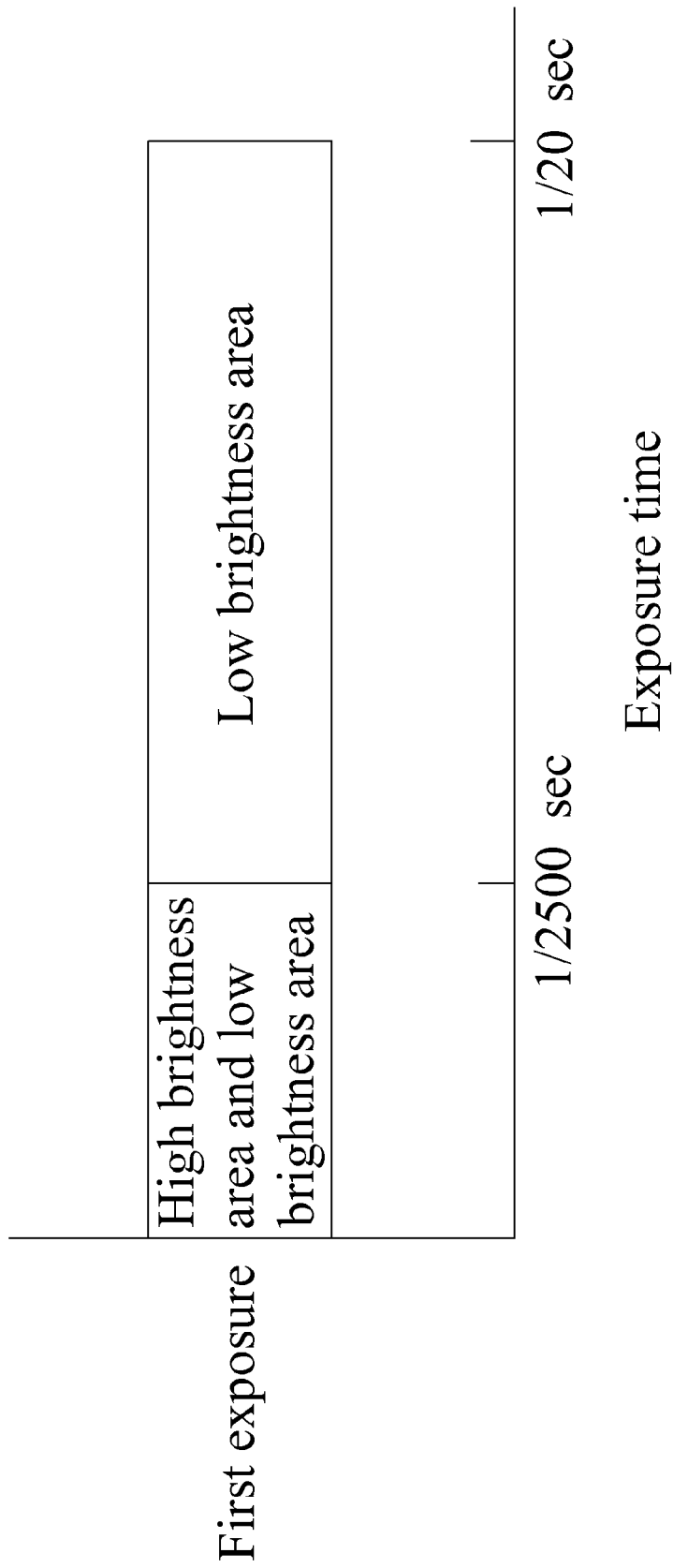
FIG. 3 shows the sequence of exposure time of different exposure areas according to an embodiment of the digital camera operating method of present invention.

Please refer to FIG. 3 that shows the sequence of exposure and lengths of exposure time for different exposure areas according to an embodiment of the digital camera operating method of present invention. In this embodiment, the camera is set to allow different components thereof to obtain a perfect image in one single shoot. FIG. 3 shows different exposure areas and the exposure sequence and the exposure time thereof. In practical operation of the digital camera 1, the high brightness area and the low brightness area as indicated in FIG. 3 is sky and ground, respectively. When the exposure area is the high brightness area, the contrast between the high brightness area and the low brightness area is 7 EV. That is, the high brightness area requires an exposure time of only $1/2500$ second while the low brightness area requires an exposure time of $1/20$ second. However, the contrast level of 7 EV has already exceeded a dynamic range of 5 EV of the image sensing elements. Therefore, the exposure compensation value (EV) for the high brightness area should be lowered by more than 2 EV to fall in the dynamic range of 5 EV.

As can be seen in FIG. 3, when the exposure begins, the high brightness area and the low brightness area have the same exposure-start time. When the exposure time reaches $1/2500$ second, the exposure of the high brightness area stops while the exposure of the low brightness area continues until the exposure time reaches $1/20$ second. Then, the exposure ends. After image processing, the image is displayed on the display 121 for viewing by the user.

In practical application of the present invention, the high brightness area can be the specific area, and the low brightness area can be the non-specific area. The exposure occurs in the specific area and the non-specific area at the same time from the exposure-start time to the time point of $1/2500$ second. Thereafter, the firmware or the control module of the camera will control the image sensing elements corresponding to the specific area to immediately stop obtaining image signal, that is, to stop exposure of the specific area. However, the exposure of the non-specific area continues until the exposure time reaches the time point of $1/20$ second to complete the exposure procedure. In this embodiment, the specific area and the non-specific area have the same exposure-start time, but have different lengths of exposure time.

Figure 4:
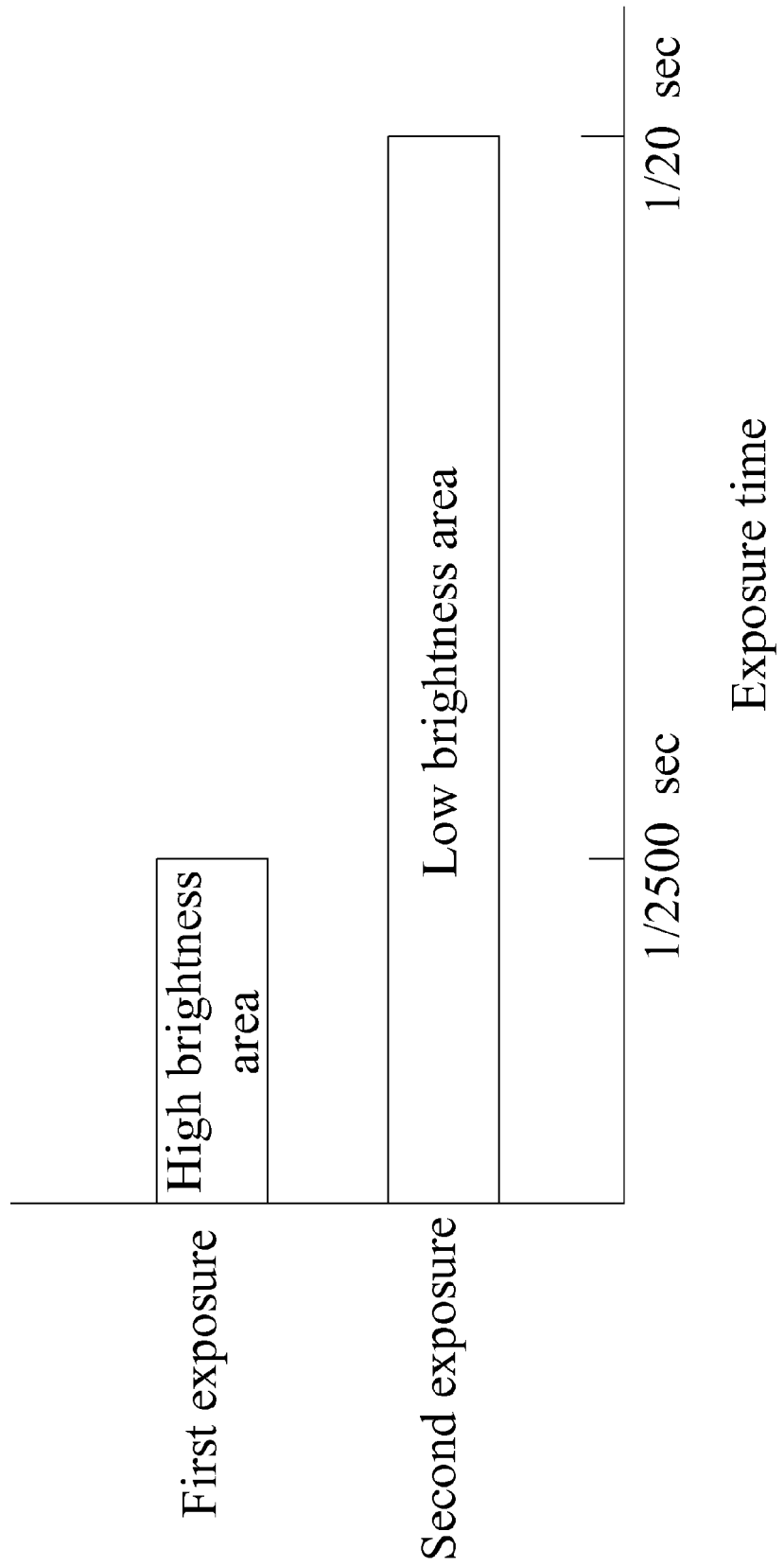
FIG. 4 shows the sequence of exposure time of different exposure areas according to another embodiment of the digital camera operating method of present invention.

Please refer to FIG. 4 that shows the sequence of exposure and lengths of exposure time for different exposure areas according to another embodiment of the digital camera operating method of present invention. In this embodiment, the camera is differently set to allow different components thereof to obtain a perfect image in one single shoot. FIG. 4 shows different exposure areas and the exposure sequence and the exposure time thereof. When the exposure area is the high brightness area, the contrast between the high brightness area and the low brightness area is 7 EV. That is, the high brightness area requires an exposure time of only $1/2500$ second while the low brightness area requires an exposure time of $1/20$ second. However, the contrast level of 7 EV has already exceeded a dynamic range of 5 EV of the image sensing elements. Therefore, the exposure compensation value (EV) for the high brightness area should be lowered by more than 2 EV to be within the dynamic range of 5 EV.

In practical application of the present invention, the high brightness area can be the specific area, and the low brightness area can be the non-specific area. In this embodiment, the exposure in the specific area begins first while the exposure in the non-specific area does not begin. The exposure of the specific area continues until the time period of $1/2500$ second is reached. That is, the exposure of the specific area stops when the exposure time reaches $1/2500$ second. Then, the exposure of the non-specific area begins and continues for $1/20$ second. When the exposures finish, the calculation module, which has a synthesizing function, synthesizes two separate exposure areas to produce an image. In this embodiment, as described above, two different areas begin the exposure at different time points. That is, the specific area and the non-specific area begin the exposure at different time point. When one of the specific area and the non-specific area finishes the exposure, the other area begins the exposure thereof. Further, the high brightness area and the low brightness area have different lengths of exposure time.

The present invention has been described with some preferred embodiments thereof and it is understood these embodiment are intended to give a more clear description of the characteristics and spirit of the present invention instead of restricting the scope thereof, and that many changes and modifications and equivalent arrangements in the described embodiments can be carried out without departing from the scope and the spirit of the invention that is intended to be limited only by the appended claims. Therefore, the scope of the claims should be interpreted in the broadest possible meaning thereof to include all the possible changes and other equivalent arrangements thereof.

What is claimed is:

1. A digital camera, comprising:
    an image sensing module consisting of N pieces of image sensing elements for obtaining a plurality of image signals corresponding to a first image, wherein N is a positive integer larger than 1;
    a display for displaying the first image as a live-view image;
    an operating element being used by a user to select a specific area on the first image and to set a correction parameter for the specific area; and
    a control module being connected to the image sensing module and the display for obtaining information about a position of the specific area relative to the first image and the correction parameter, and using the obtained position information and the correction parameter to control M pieces of the image sensing elements in the image sensing module corresponding to the specific area, so that a second image is recorded based on the correction parameter; wherein M is a positive integer smaller than or equal to N, and wherein the correction parameter is selected from the group consisting of an exposure compensation value (EV) parameter, an exposure time parameter, and a gradation parameter.

2. The digital camera as claimed in claim 1, wherein the M pieces of the image sensing elements have an exposure-start time the same as that for the remaining (N-M) pieces of image sensing elements.

3. The digital camera as claimed in claim 1, wherein the M pieces of the image sensing elements have an exposure-start time different from that for the remaining (N-M) pieces of image sensing elements.

4. The digital camera as claimed in claim 1, wherein the display is a touch screen.

5. The digital camera as claimed in claim 4, wherein the operating element is selected from the group consisting of a stylus and a user's finger.

6. The digital camera as claimed in claim 1, wherein the operating element is a button.

7. The digital camera as claimed in claim 1, further comprising an image calculation module connected to the image sensing module and the display for converting the image signals produced by the image sensing elements into the first image.

8. An operating method of a digital camera, the digital camera including an image sensing module consisting of N pieces of image sensing elements, wherein N is a positive integer larger than 1, the method comprising the following steps:
    obtaining a first image; displaying the first image as a live-view image;
    determining a specific area on the first image as selected by a user, and a correction parameter as set by the user for the specific area;
    obtaining information about a position of the specific area relative to the first image; and
    using the correction parameter and the position information to control M pieces of the image sensing elements in the image sensing module corresponding to the specific area, so that a second image is recorded based on the correction parameter; wherein M is a positive integer smaller than or equal to N, and wherein the correction parameter is selected from the group consisting of an exposure compensation value (EV) parameter, an exposure time parameter, and a gradation parameter.

9. The operating method as claimed in claim 8, wherein the M pieces of the image sensing elements have an exposure-start time the same as that for the remaining (N-M) pieces of image sensing elements.

10. The operating method as claimed in claim 8, wherein the M pieces of the image sensing elements have an exposure-start time different from that for the remaining (N-M) pieces of image sensing elements.

* * * * *